Patented Mar. 28, 1944

2,344,965

UNITED STATES PATENT OFFICE 2,344,965

DERIVATIVES OF 3.17-DIOLS OF THE CYCLO-PENTANO POLYHYDROPHENANTHRENE SERIES AND METHOD FOR PRODUCING THE SAME

Adolf Butenandt, Danzig-Langfuhr, Freestate Danzig, and Lothar Strassberger, Berlin-Wilmersdorf, Germany, assignors, by mesne assignments, to Schering Corporation, Bloomfield, N. J., a corporation of New Jersey No Drawing. Application August 29, 1936, Serial No. 98,617. In Germany August 30, 1935

2 Claims. (Cl. 260—397.5)

The present invention relates to derivatives of 3,17-diols of the cyclopentano-polyhydrophenanthrene series and to a method of producing the same.

To the 3,17-diols of the cyclopentano polyhydrophenanthrene series to be used as starting materials for the present invention belong especially compounds of the $C_{19}$-series, such as anhydrostandiols-3,17, androsten-diols-3,17, furthermore such saturated or unsaturated androstan-diol-3,17- compounds as contain at the carbon atom 17 besides the hydroxyl group a hydro-carbon radical, as, for instance, 17-alkyl-androstan diols-3,17, 17-alkylandrostendiols-3,17 and so on. The derivatives to be produced according to the present invention may be compounds wherein 1 or 2 hydroxyl groups are esterified; however, 1 or 2 hydroxyl groups of the diols may be etherified or replaced by halogen or any other group.

The methods for the production of the said derivatives of the diols are the same as they are employed in analogous reactions for replacing a hydroxyl group by any other group.

According to the present invention mono-derivatives, especially 17-mono-derivatives, and di-derivatives of 3,17-diols can be produced which are either themselves physiologically active or can be transformed into physiologically active compounds.

The mono-derivatives can be produced from the diols either directly by substituting only one hydroxyl group, they can, however, also be obtained from the di-derivatives of the diols by reconverting into the hydroxyl group a substituent of the derivatives of the 3,17-diols in a suitable manner for instance, by hydrolysis. As especially suitable for the production of the 17-mono-derivatives have proved themselves the mixed di-derivatives wherein the substituent at the carbon atom 3 can easily be reconverted into the hydroxyl group whereas the substituent at the carbon atom 17 is relatively difficultly replaceable by the hydroxyl group.

The said mixed di-derivatives of the 3,17-diols can be obtained by treating suitable 3-mono-derivatives of 3,17-diols with corresponding agents. The 3-mono-derivatives to be used for the production of the mixed di-derivatives may have been prepared in any desired manner, for instance, by reduction of 3-derivatives of the corresponding 3-hydroxy-17-keto-compounds.

Considering the production of said mixed di-derivatives, for replacing the hydroxyl group at the carbon atom 3 by substituents easily reconvertible into the hydroxyl group, agents are suitable that are capable of introducing, for instance, an aliphatic carboxylic acid radical having a straight chain of carbon atoms, such as the acetic acid radical, whereas for replacing the hydroxyl group at the carbon atom 17 by substituents relatively difficulty reconvertible into the hydroxyl group, acylating agents are to be taken into consideration that have a branched chain of carbon atoms such as, for instance, compounds of the isobutyric acid, iso-valeric acid, substituted and unsubstituted benzoic and naphthoic acids, chlorsulfonic acids, chlorformic acid, phenylisocyanic acid and so on; advantageously, instead of or in combination with acylating agents etherifying agents or halogenating agents may be used in a corresponding manner.

The present invention may be further illustrated, for instance, by the following structural formulas, wherein X and X' represent groups that are introduced at the place of a hydroxyl group by esterification, etherification, halogenation or similar treatment and that can be reconverted into the hydroxyl groups by hydrolysis or corresponding treatment, whereas R stands for hydrogen or a hydro-carbon radical.

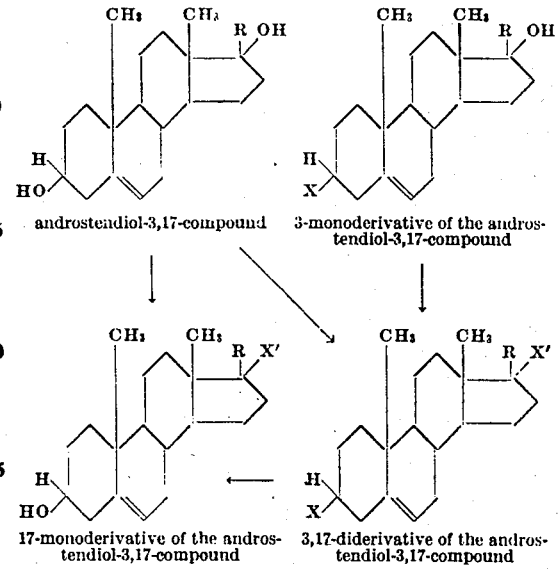

androstendiol-3,17-compound   3-monoderivative of the androstendiol-3,17-compound 17-monoderivative of the androstendiol-3,17-compound   3,17-diderivative of the androstendiol-3,17-compound The following examples serve to illustrate the invention without, however, limiting the same to them:

*Example 1*

30 mg. of androstendiol-3.17 are acetylated by warming with acetic acid anhydride for ¾ hour. After distillation in a high vacuum at 130° C. and crystallisation from pure methanol 27.1 mg. of androstendiol-diacetate of M. P. 158–158.5° C. and of the formula $C_{23}H_{34}O_4$ are obtained. The diester exhibits an optical rotation of $[\alpha]D^{18}=-56.5°$ (in alcohol).

194 mg. of this androstendiol-diacetate are allowed to stand for 10 hours with 0.8 mol of caustic potash lye (23.2 mg.) in 65 ccs. of methanol, acidified with dilute hydrochloric acid, poured into water, and extracted with ether. The ethereal solution is washed, dried, and distilled off. The residue is recrystallised once from pure petrol ether and then up to a constant melting point of 144–146° from dilute acetone. The yield amounts to 89.3 mg. In this product only the hydroxyl group on the carbon atom 17 is esterified.

monoacetate however is now present in such a surplus that it can be isolated in satisfying yield (up to 42% of the theoretical yield).

The following schedule may serve to give a survey of the proportion of the isolated monoacetate to the duration of the action of the potassium hydroxide solution and to the concentration. In all sets 0.8 mol of potassium hydroxide is used for 1 mol of iso-androstandiol-diacetate.

|   | Diacetate, mg. | Duration, hours | Mixture, mg. | Diol, mg. | Monoacetate, mg. | Percent | M. P., degrees | Concentration g. 1000 ccs. methanol |
|---|---|---|---|---|---|---|---|---|
| 1 | 1,050 | 24 | 810 | 40 | 127 | 13.7 | 147–8 | 2.62 |
| 2 | 710 | 44 | ---- | ---- | 130 | 20.6 | 144–6 | 2.84 |
| 3 | 310 | 60 | 190 | 25 | 85 | 30.9 | 143–6 | 2.82 |
| 4 | 1,300 | 63 | 1,070 | 200 | 410 | 31.5 | 145–6 | 2.60 |
| 5 | 2,300 | 64 | 2,060 | ---- | 820 | 39.8 | 144–5 | 3.08 |
| 6 | 1,800 | 74 | 1,680 | 460 | 670 | 42 | 143–6 | 3.10 |
| 7 | 1,880 | 58 | 1,660 | 240 | 650 | 38.8 | 144–5 | 3.08 |

*Example 2*

1 g. iso-androstandiol-3.17, obtained by treating iso-androsterone with sodium and propyl alcohol or with aluminium-amalgam, are dissolved in 20 ccs. acetic acid anhydride and the solution is boiled for 15 minutes the diacetate formed is recrystallised from diluted alcohol, it has a M. P. of 123–124° C.

770 mg. of this iso-androstandiol-diacetate are allowed to stand for 23 hours at 15–20° C. in a mixture of 300 ccs. methanol containing 21.2 mg. potassium hydroxide. The reaction mixture is diluted with water and extracted with ether; the ethereal solution contains 470 mg. of a mixture melting at 95–121° C. Therefrom by recrystallisation the iso-androstandiol-mono-acetate-17 of the M. P. 157° C. can be obtained.

*Example 3*

1.05 gram iso-androstandiol-3.17-diacetate (M. P. 123–124° C.) are allowed to stand in 400 ccs. methanol containing 126 mg. of potassium hydroxide (0.8 mol) at 18° C. for 24 hours. The reaction mixture is diluted with water and neutralised whereafter it is extracted with ether. The ethereal solution is evaporated to dryness and the residue consisting of light coloured oil is recrystallised from diluted acetone. 810 mg. of a mixture melting from 75–112° C. are obtained; the mixture is suspended in petrol ether and the solution formed filtered off from the undissolved iso-androstandiol. The filtrate is partly evaporated off whereby the monoacetate crystallises first, which has a M. P. of 147–148° C. after recrystallising from petrol ether and diluted acetone; the residue obtained on evaporating the petrol ether filtrate to dryness represents a mixture of mono- and di-acetate. The yield of the pure monoacetate amounts to about 127 mg. (13.7% of the theoretical yield). As the separation of the mono-acetate from the diacetate is very difficult to complete the action of the potassium hydroxide on the diacetate is continued up to 60–70 hours. Thereby the amount of the diol formed is many times increased, the

*Example 4*

1.6 gram 3-acetoxy-17-chlor-androsten are dissolved in 360 ccs. of pure methanol and mixed with 40 ccs. of a methyl alcoholic potassium hydroxide solution containing 0.2703 gram of potassium hydroxide. The reaction mixture is allowed to stand for 40 hours at room temperature in which time the acetoxy group is hydrolised. The solution is poured into water and extracted with ether; the ethereal solution is washed with water, freed from water and evaporated to dryness. 1.4 gram of 3-hydroxy-17-chlor-androsten are obtained which can be recrystallised from methanol and have a M. P. 156° C.

*Example 5*

1 gram trans-androstandiol-monoacetate-3 is dissolved in 15 ccs. of pyridine and mixed with a solution of 1 gram of benzoylchloride in 5 ccs. benzene. The mixture is heated to 80° for 1 hour and worked up as described in Example 4. After recrystallisation from methanol the trans-androstandiol-acetate-3-benzoate-17 of the M. P. 140° is obtained.

*Example 6*

2 grams androstandiol-monoacetate-3 are dissolved in 25 ccs. of pyridine and mixed with a solution of 2.2 grams o-nitrobenzoylchloride in 10 ccs. of benzene. After heating the solution to 60–70° for 1 hour it is worked up as described in Example 4. After recrystallisation from methanol the androstendiol-acetate-3-o-nitrobenzoate-17 of the M. P. 240° is obtained.

*Example 7*

3 grams of Raney-catalyst in 70 ccs. of ethanol are previously reduced with hydrogen at room temperature. Then 7 grams of androstenol-3-one-17-acetate obtained by acylating dehydroandrosterone with acetic acid anhydride are added and the mixture is shaken with hydrogen until 1 mol of hydrogen is taken up whereafter the reduction ceases. The solution is filtered off from the catalyst and the solvent is evaporated in vacuum. The androstendiol-monoacetate-3 of the M. P. 144–145° remains.

7 grams of androstendiol-monoacetate-3 are dissolved in 110 ccs. of pyridin and while shaking and cooling mixed with 35 ccs. of benzene containing 7 grams of benzoyl-chloride. After standing for 4 hours at room temperature the reaction mixture is poured on ice and repeatedly extracted with ether; the ethereal solution is freed from pyridine and benzoic acid by successively shaking it with diluted sulfuric acid and sodium carbonate solution. After freeing the ethereal solution from water it is evaporated to dryness. The residue yields on recrystallisation from methanol the androstendiol-acetate-3-benzoate-17 of the M. P. 174–5° C.

4.36 grams of androstendiol-acetate-3-benzoate 17 are dissolved in a mixture of 800 ccs. of methanol and 450 ccs. of ether and a solution of 0.56 gram of potassium hydroxide and 30 ccs. of ethanol is added thereto. The reaction mixture is allowed to stand at room temperature for 2 days while repeatedly being shaken. Thereafter it is poured into 4 liters of water and repeatedly extracted with ether. The ethereal solution is freed from water, the ether is evaporated and the residue recrystallised from methanol. The androstendiol-monobenzoate-17 obtained melts at 214–215° C.

Example 8

2.4 grams of cis-androstandiol°3.17 of the M. P. 223° are dissolved in 20 ccs. of pyridine and mixed with 1 gram of acetic acid anhydride (1.2 mol). The reaction mixture is allowed to stand at room temperature for about 20 hours whereafter it is diluted with water and extracted with ether. The ethereal solution is successively washed with hydrochloric acid, sodium carbonate solution, and water, freed from water and evaporated to dryness. The residue is heated with petrol ether and the solution formed is filtered off from the undissolved portion which consists of about 350 mg. of the difficulty soluble diol. On cooling the petrol ether filtrate about 800 mg. of crude cis-androstandiol-monoacetate-17 are obtained that can be easily purified by recrystallising from diluted methanol, the pure product has a M. P. of 191–192° C. On evaporating the mother liquor of the petrol ether solution and on recrystallising the residue obtained from petrol ether and ether a further amount of cis-androstandiol-monoacetate-17 is obtained.

Example 9

10 grams of androstendiol-3.17-monotriphenylmethylether-3 are warmed in pyridine solution with 6 grams of acetic acid anhydride to about 80° C. for several hours. After cooling the reaction mixture it is diluted with aqueous sodium carbonate solution and extracted with ether. The ethereal solution is washed first with an aqueous solution of sodium bisulfate and subsequently with an aqueous solution of sodium bicarbonate. After freeing the ethereal solution from water and evaporating the solvent the 3-triphenylmethylether-17-acetate of the androstendiol-3.17 remains which can be purified by recrystallisation from ethyl acetate. It melts at 161° C.

Example 10

10 gr. of 3-triphenylmethylether-17-acetate of androstendiol-3.17 are dissolved in 100 ccm. of acetone and the solution is heated to boiling with 10 ccs. of 1N sulfuric acid for 1 hour. After cooling the reaction mixture it is diluted with aqueous sodium carbonate solution and extracted with ether. After freeing the ethereal solution from water and evaporating the solvent the 17-monoacetate of the androstendiol-3.17 is obtained which can be purified by recrystallisation from hexane. The pure 17-monoacetate melts at 146° C.

Instead of the 3,17-diol-derivatives of the cyclopentano polyhydrophenanthrene series mentioned in the foregoing examples other corresponding derivatives may be used for the performance of the process of the present invention; thus, according to the methods described above, for instance, diphenylmethylether, p-toluyl-diphenyl-methylether, methoxy-methylether or other alkoxy, aroxy, aralkoxy derivatives as well as alkoxy-acyl-, aroxy-acyl- or aralkoxy-acyl-derivatives of the diols may be obtained.

Various other modifications in the process and reagents may be resorted to within the scope of the appended claims without departing from the principles set forth herein.

What we claim is:

1. A 10,13-dimethyl cyclopentano polyhydrophenanthrene compound having in the 3-position a member of the group consisting of hydroxyl and groups convertible into hydroxyl with the aid of hydrolysis and having in the 17-position an etherified hydroxyl group.

2. A 10,13-dimethyl cyclopentano polyhydrophenanthrene compound having in the 3-position a free hydroxyl group, and in the 17-position an etherified hydroxyl group.

ADOLF BUTENANDT.
LOTHAR STRASSBERGER.